No. 846,746. PATENTED MAR. 12, 1907.
C. V. KERR.
COMBINED BUSHING AND BEARING FOR SHAFTS OF STEAM TURBINES.
APPLICATION FILED JULY 6, 1905.

Inventor
Charles V. Kerr
By W. Schornborn
Attorney

Witnesses
Edwin L. Yewell
John H. Holz

UNITED STATES PATENT OFFICE.

CHARLES V. KERR, OF WELLSVILLE, NEW YORK.

COMBINED BUSHING AND BEARING FOR SHAFTS OF STEAM-TURBINES.

No. 846,746.  Specification of Letters Patent.  Patented March 12, 1907.

Application filed July 6, 1905. Serial No. 268,493.

*To all whom it may concern:*

Be it known that I, CHARLES V. KERR, a citizen of the United States, residing at Wellsville, in the county of Allegany and State of New York, have invented certain new and useful Improvements in a Combined Bushing and Bearing for Shafts of Steam-Turbines, of which the following is a specification.

My invention relates to loose bushings which are more especially adapted to surround a rapidly-revolving shaft at the sections which pass through the walls separating one expansion-chamber from another in a multiple-expansion turbine, as shown, for example, in my former application Serial No. 227,804 and filed October 10, 1904.

The objects of my invention are, first, to provide a bushing which is provided with means to lubricate the bearing of the shaft passing through the same and at the same time make a fluid-tight joint between the bushing and shaft and the wall separating one expansion-chamber from another; second, to provide a bushing which is seated and held in a suitable depression in the several separating-walls of the expansion-chambers by the difference of pressures between the adjacent chambers; third, to provide a bushing which is not only fluid-tight, but at the same time checks any vibration due to an unbalanced bucket-disk on the rotary shaft; fourth, to provide a bushing which is cheaply manufactured, durable, easily replaced or inserted in its proper relation, and reduces to a minimum the friction between the bushing and the rotary shaft; fifth, other evident advantages of construction and relation of parts, which will appear from the hereinafter-detailed description and mode of operation.

The invention consists of features of construction which will be hereinafter more clearly described, and particularly pointed out in the appended claims.

Figure 1:
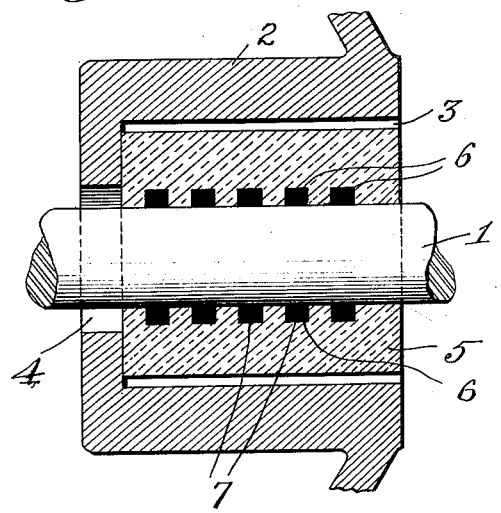
Figure 2:
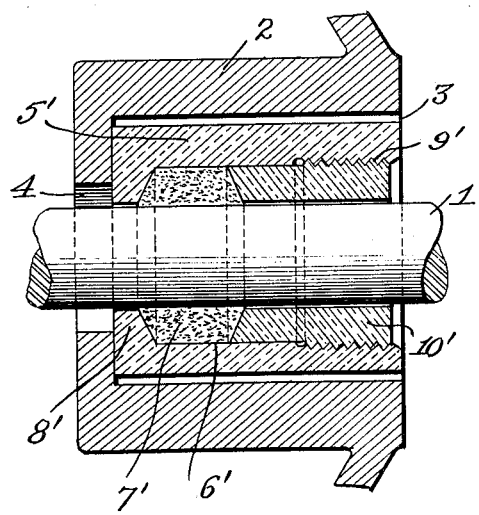
Figure 3:
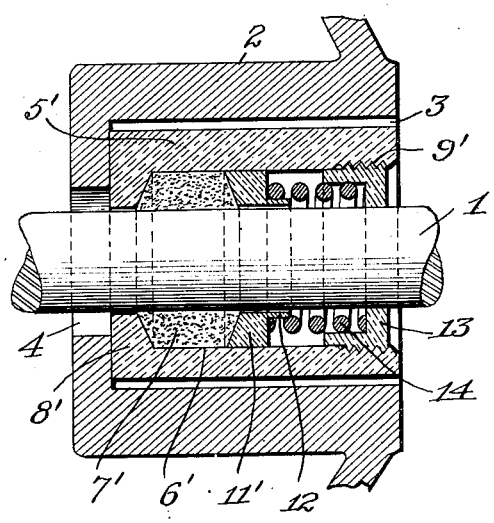

In the one sheet of drawing, in which similar reference characters indicate the same parts in the several figures, Figure 1 is a longitudinal section of one form of my improved bushing, showing a portion of the shaft and a fragment of one of the several walls separating one expansion-chamber from another. Fig. 2 is a similar section of a modified form of the same invention. Fig. 3 is a section of another form of the same invention.

Referring to Fig. 1 of the drawings, 1 is the rotary shaft, which supports and carries the bucket-wheels (not shown) and forming the rotor element of the turbine. 2 is a fragment of one of the division walls of the casing, which separates one expansion-chamber from another and is formed at its central section, through which passes the rotary shaft 1, with a depression or pocket 3, having at its bottom a central opening 4, through which easily passes the shaft 1. Seated loosely in the depression or pocket 3 and surrounding the rotary shaft and having a free-running fit therewith is a bushing 5, preferably made of brass and made annular in cross-section. In the interior of the bushing and adjacent to the shaft is provided a series of spaced grooves 6 6, which are adapted to hold or contain a solid lubricant 7, such as graphite or similar material, which not only lubricates the shaft, but at the same time checks the leak of motive fluid along the shaft. The motive fluid in passing from one expansion-chamber to the next stage is of a higher pressure than that in the next succeeding chamber. Consequently the loose bushing 5 is firmly held in the pocket or depression 3 by the preponderance of pressure on the end of the bushing corresponding to the enlarged opening of the pocket 3.

In the form of bushing shown in Fig. 2 the general arrangement and construction is the same, only that instead of using the inner grooves and graphite packing I have provided the bushing 5' with an inner pocket or opening 6', having at one end a flange or collar 8' and at its other end a screw-threaded section 9'. 7' is a fibrous packing soaked with oil and graphite inserted in the opening 6' about the shaft and at the end adjacent to the collar 8'. 10' is a follower which passes into the opening 6' and engages the threaded section 9', which on being screwed up compresses the fibrous packing 7' and forces it against the rotary shaft 1. It will be noticed that both the collar or flange 8' and the follower 10' have a free-running fit with the shaft.

In Fig. 3 is substantially the same form of invention as shown in Fig. 2, except a yielding and loose follower 11' is provided, on which is formed a collar 12. 13 is a cup-shaped sleeve having external threads engaging the outer screw-threaded end 9' of the bushing. 14 is a coil-spring inserted about the shaft 1 and resting on the collar 12 and between the loose follower 11' and cup-shaped follower 13.

From the foregoing description of the structural features and relative arrangement of the parts comprising my invention it will be seen that I have devised a bushing which is not only especially well adapted for the purpose of making a perfectly fluid-tight joint between a rotary shaft and the walls separating the different sections or stages of expansion in a motive-fluid turbine, but owing to the yielding feature or adaptability of the bushings in the seat permits the shaft to properly adjust itself within its several bearings, thus avoiding unusual strain and wear of the parts and at the same time checking the usual accompanying vibration of a rapidly-revolving shaft.

While I have shown several forms of my invention, it will be readily understood that many changes may be made in the structural features and relative arrangements of the parts comprising the combined bushing and bearing herein shown without in any way departing from the spirit of my invention.

Having now fully described my invention, what I claim as new, and desire to secure by Letters Patent, is—

1. A combined loose bushing and bearing for rotary shafts of turbines comprising a separating-wall or partition having a depression or pocket opening toward the interior of the turbine, an opening in the depression or pocket for the passage of the shaft, a bushing surrounding the shaft and loosely seated in said depression or pocket and retained therein by the motive-fluid pressure within the turbine, and a combined packing and lubricant material within the bushing adjacent to the bearing-surface of the shaft.

2. A combined loose bushing and bearing for rotary shafts of turbines comprising a separating-wall or partition having a depression or pocket opening toward the interior of the turbine, an opening in the depression or pocket for the passage of the shaft, a bushing surrounding the shaft and loosely seated in said depression or pocket and retained therein by the motive-fluid pressure within the turbine, a combined packing and lubricant material within the bushing and adjacent to and in contact with the shaft, and means for compressing and forcing the combined packing and lubricant material against the shaft.

3. A combined loose bushing and bearing for rotary shafts of turbines, comprising a separating-wall or partition having a depression or pocket opening toward the interior of the turbine, an opening in the depression or pocket, for the passage of the shaft, a bushing surrounding the shaft and loosely seated in said depression or pocket and retained therein by motive-fluid pressure within the turbine, a combined packing and lubricant material within the bushing adjacent to and in contact with the shaft and means yieldingly compressing the combined packing and lubricant material against the shaft.

4. A combined loose bushing and bearing for rotary shafts comprising a separating-wall or partition having a depression or pocket, an opening in the depression or pocket for the passage of the shaft, a bushing surrounding the shaft and loosely seated in said depression and retained therein by motive-fluid pressure, a collar on the inner side and at one end of the loose bushing, a threaded section on the other end of the bushing from that of the collar, a combined packing and lubricant material within the bushing adjacent to and in contact with the shaft and means engaging the threaded sections for compressing and confining the combined packing and lubricant material within the bushing and against the shaft.

5. A combined loose bushing and bearing for rotary shafts comprising a separating-wall or partition having a depression or pocket, an opening in the depression or pocket for the passage of the shaft, a bushing surrounding the shaft and loosely seated in said depression or pocket and retained therein by motive-fluid pressure, a collar on the inner side and at one end of the bushing, a threaded section on the other end of the bushing from that of the collar, a screw-threaded sleeve surrounding the shaft and engaging the threads on the bushing, a follower loosely surrounding the shaft within the bushing and interposed between the collar and the sleeve, a combined packing and lubricant material within the bushing and surrounding the shaft between the collar and follower and a coiled spring surrounding the shaft and interposed between the follower and sleeve.

In testimony whereof I affix my signature in presence of two witnesses.

CHARLES V. KERR.

Witnesses:
 WM. D. APPLEBEE,
 V. R. BRUER.